US007022884B2

(12) United States Patent
Ostrowski et al.

(10) Patent No.: US 7,022,884 B2
(45) Date of Patent: Apr. 4, 2006

(54) PREPARATION OF POLYETHERPOLYOLS IN THE PRESENCE OF A MULTIMETAL CYANIDE COMPLEX CATALYST

(75) Inventors: Thomas Ostrowski, Castrop-Rauxel (DE); Kathrin Harre, Dresden (DE); Georg Heinrich Grosch, Bad Dürkheim (DE); Jürgen Winkler, Schwarzheide (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 53 days.

(21) Appl. No.: 10/203,836

(22) PCT Filed: Feb. 16, 2001

(86) PCT No.: PCT/EP01/01782

§ 371 (c)(1),
(2), (4) Date: Aug. 14, 2002

(87) PCT Pub. No.: WO01/62824

PCT Pub. Date: Aug. 30, 2001

(65) Prior Publication Data

US 2003/0013920 A1    Jan. 16, 2003

(30) Foreign Application Priority Data

Feb. 24, 2000 (DE) .............................. 100 08 629

(51) Int. Cl.
*C07C 41/03* (2006.01)
(52) U.S. Cl. ..................... 568/620; 568/623; 568/624; 568/625; 568/679; 568/680
(58) Field of Classification Search ................ 568/620, 568/623, 624, 625, 679, 680; 422/205, 198, 422/224, 203, 208, 226
See application file for complete search history.

(56) References Cited

U.S. PATENT DOCUMENTS

| 3,894,093 | A | 7/1975 | Raizner et al. ......... 260/613 B |
| 4,472,560 | A | 9/1984 | Kuyper et al. ............... 526/120 |
| 5,478,535 | A | 12/1995 | Fierz et al. ................. 422/205 |
| 5,811,595 | A | 9/1998 | Ellis .......................... 568/620 |
| 6,303,833 | B1 | 10/2001 | Grosch et al. ............. 568/613 |
| 6,319,999 | B1 | 11/2001 | Fanelli ....................... 526/67 |
| 6,428,199 | B1 * | 8/2002 | Rupaner et al. ......... 366/172.1 |

FOREIGN PATENT DOCUMENTS

| DE | 19742978 | 4/1999 |
| EP | 633060 A1 | 1/1995 |
| EP | 850954 A1 | 7/1998 |

OTHER PUBLICATIONS

Translation of the International Preliminary Examination Report Dated Jan. 3, 2002.

* cited by examiner

*Primary Examiner*—Rosalynd Keys
(74) *Attorney, Agent, or Firm*—Fernando A. Borrego

(57) ABSTRACT

Polyetherpolyols are prepared by reacting diols or polyols with ethylene oxide, propylene oxide, butylene oxide or a mixture thereof in the presence of a multimetal cyanide complex catalyst by a process which is carried out in a vertical, highly cylindrical reactor having a central stirrer and having heat exchanger plates through which a heat-exchange medium flows and which are arranged essentially in the longitudinal direction of the reactor, at an angle α of from 0 to 70° in the direction of rotation of the stirrer relative to the reactor radius.

16 Claims, No Drawings

PREPARATION OF POLYETHERPOLYOLS IN THE PRESENCE OF A MULTIMETAL CYANIDE COMPLEX CATALYST

The present invention relates to a process for the preparation of polyetherpolyols.

Polyetherpolyols are provided in large amounts, in particular for the preparation of polyurethane foams. The known processes for the preparation of polyetherpolyols are carried out as a rule from alkylene oxide in the presence of a short-chain initiator with the use of different catalysts, such as bases, water-repellent double-layer hydroxides, acidic or Lewis acid systems, organometallic compounds or multimetal cyanide complexes.

Heterogeneous multimetal cyanide complex catalysts are highly selective and active catalysts which are suitable in particular for the preparation of flexible-foam polyetherpolyols, where a high molecular weight has to be reached and long oxyalkylation times are required. By using multimetal cyanide complex catalysts, the production costs can be reduced and at the same time high-quality polyetherpolyol which can be further processed to give polyurethane foams which have little odor and are therefore of high quality can be obtained. The literature discloses that secondary reactions which can lead to the formation of odorous substances and unsaturated components scarcely occur.

However, the high activity has the result that the heat of reaction can no longer be removed in conventional reactors. If the polyetherpolyol preparation catalyzed by a multimetal cyanide complex is carried out in standard stirred kettles, the metering rates of alkylene oxide are limited by the heat removal rate of the heat exchanger.

U.S. Pat. No. 5,811,595 proposes an ideally mixed reactor comprising one or two heat exchangers, the polyetherpolyol being fed into the circulation stream of the heat exchanger and the ethylene oxide into the reactor. Mixing of the ethylene oxide with the liquid phase is achieved by means of a nozzle.

Disadvantages of this process are the high circulation rate required for maintaining the high heat removal rate and the danger of mechanical damage to the heterogeneous catalyst by the pump. Moreover, the highly reactive ethylene oxide is introduced into the reactor in which, owing to the cooling collars used, the heat removal is very poor, in particular at low fill levels, because of the small exchange area. Overheating owing to the high reaction rate, resulting in damage to the product, can occur. This may be increased by the poor mixing in the reactor.

EP-A-0 850 954 describes a process in which the reaction takes place in the gas space above the reaction liquid. The polyetherpolyol is circulated via a heat exchanger and fed in through nozzles. This results in a large liquid surface. Simultaneously with this, ethylene oxide and polyetherpolyols are metered in via nozzles. The large surface results in good mass transfer and hence high reaction rates.

Owing to the high reaction rate which can be achieved with this process, local excess temperatures are likely in the individual droplets and in turn may result in damage to the product. Furthermore, here too the high circulation rate required for heat removal is not without problems for the heterogeneously dispersed multimetal cyanide complex catalyst; the danger of damage cannot be ruled out.

The artificially enlarged gas phase is a further potential danger, in particular in the ethoxylation, since free alkylene oxide is present in the gas phase. Ethylene oxide tends to gas-phase decomposition, which can lead to bursting of the reactor. On the other hand, when the polyetherpolyol or ethylene oxide is passed into the liquid, rapid reaction of the alkylene oxide is to be expected owing to the active multimetal cyanide complex.

EP-B-0 633 060 discloses a reactor for gas-liquid reactions which comprises a central stirring apparatus, around which heat exchanger plates through which a heat-exchange medium flows are arranged at an angle from 0 to 70° in the direction of rotation of the stirrer relative to the reactor radius. As a result of the direct heat removal at the point of heat generation, higher productivity, a high product quality and reduced catalyst consumption can be ensured. The reactor EP-B-0 633 060 was proposed in particular for highly exothermic catalytic hydrogenation reactions.

It is an object of the present invention to provide a process which employs a simple apparatus for the preparation of polyetherpolyols in the presence of multimetal cyanide complex catalysts with improvement of the space-time yield and avoidance of local overheating and hence a higher level of secondary reactions, thus ensuring a high product quality.

We have found that this object is achieved by a process for the preparation of polyetherpolyols by reacting diols or polyols with ethylene oxide, propylene oxide, butylene oxide or a mixture thereof in the presence of a multimetal cyanide complex catalyst.

In the invention, the reaction is carried out in a vertical, highly cylindrical reactor having a central stirrer and having heat exchanger plates through which a heat-exchange medium flows and which are arranged essentially in the longitudinal direction of the reactor, at an angle $\alpha$ of from 0 to 70° in the direction of rotation of the stirrer relative to the reactor radius.

The vertical, highly cylindrical reactor described in EP-B-0 633 060 and having a central stirrer and having heat exchanger plates through which a heat-exchange medium flows and which are arranged essentially in the longitudinal direction of the reactor, at an angle of $\alpha$ of from 0 to 70° in the direction of rotation of the stirrer relative to the reactor radius was developed in particular for highly exothermic catalytic hydrogenation reactions. These involve low-viscosity liquid reaction mixtures, i.e. liquids which have a viscosity substantially below 10 mPa.s under reaction conditions.

In contrast, the inventors of the present process have surprisingly found that the reactor type disclosed in EP-B-0 633 060 can also be used for reaction media having a higher viscosity, such as the polyetherpolyols of the present invention. As a rule, polyetherpolyols have high viscosities, about in the range from 80 to 1000 mPa.s at room temperature and still above 20 mPa.s, frequently above 100 mPa.s, under reaction conditions (from about 100 to 130° C.). It is known that the boundary layer between heat exchanger and reaction mixture increases with increasing viscosity, with the result that the heat is increasingly poorly removed. According to the novel process, sufficient heat removal could be achieved in spite of the increased viscosity, so that high alkylene oxide metering rates could be realized, resulting in an improved space-time yield and hence higher productivity and a good product quality. Local excess temperatures which might lead to damage to the product were avoided.

According to the invention, diols or polyols are initially taken together with a multimetal cyanide complex catalyst in a vertical, highly cylindrical reactor having a central stirrer and having heat exchanger plates through which a heat-exchange medium flows and which are arranged essentially in the longitudinal direction of the reactor, at an angle $\alpha$ of from 0 to 70° C. in the direction of rotation of the stirrer relative to the reactor radius, and are then reacted with ethylene oxide, propylene oxide, butylene oxide or a mixture thereof. After the alkylene oxide has completely reacted, the reaction product is removed from the reactor.

The invention does not include any restrictions with regard to the multimetal cyanide complex catalyst which may be used; it may have an amorphous form but preferably has an at least partially, predominantly or completely crystalline form. If required, the catalyst is supported. Particularly preferably used multimetal cyanide complex catalysts are those of the formula (I)

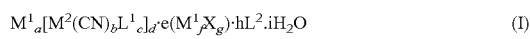

where $M^1$ is at least one element from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), Cd(II), Hg(II), Pd(II), Pt(II), V(III), Mg(II), Ca(II), Sr(II), Ba(II) and Cr(III), $M^2$ is at least one element from the group consisting of Fe(II), Fe(III), Co(III), Cr(III), Mn(II), Mn(III), Ir(III), Rh(III), Ru(II), V(IV), V(V), Co(II) and Cr(III), $L^1$ is at least one ligand from the group consisting of cyanide, carbonyl, cyanate, isocyanate, nitrile, thiocyanate and nitrosyl, X is a formate anion, acetate anion or propionate anion, $L^2$ is at least one water-miscible ligand from the group consisting of alcohols, aldehydes, ketones, ethers, polyethers, esters, urea derivatives, amides, nitriles and sulfides, a, b, d, e, f and g are integers or fractions greater than zero, c, h and i are integers or fractions greater than or equal to zero, a, b, c and d being chosen so that the electroneutrality condition is fulfilled and f and g being chosen so that the electroneutrality condition is fulfilled, whose X-ray diffraction pattern has reflections at at least the d values 6.10 Å±0.004 Å
5.17 Å±0.04 Å
4.27 Å±0.02 Å
3.78 Å±0.02 Å
3.56 Å±0.02 Å
3.004 Å±0.007 Å
2.590 Å±0.006 Å
2.354 Å±0.004 Å
2.263 Å±0.004 Å if X is a formate anion, whose X-ray diffraction pattern has reflections at at least the d values 5.20 Å±0.02 Å
4.80 Å±0.02 Å
3.75 Å±0.02 Å
3.60 Å±0.02 Å
3.46 Å±0.01 Å
2.824 Å±0.008 Å
2.769 Å±0.008 Å
2.608 Å±0.007 Å
2.398 Å±0.006 Å if X is an acetate anion, and whose X-ray diffraction pattern has reflections at at least the d values 5.59 Å±0.05 Å
5.40 Å±0.04 Å
4.08 Å±0.02 Å
3.94 Å±0.02 Å
3.76 Å±0.02 Å
3.355 Å±0.008 Å
3.009 Å±0.007 Å
2.704 Å±0.006 Å
2.381 Å±0.004 Å if X is a proprionate anion or which have a monoclinic crystal system if X is an acetate anion.

Such multimetal cyanide complex catalysts are described in DE-A-197 42 978.

According to the invention, the process is carried out in a vertical, highly cylindrical reactor having a central stirrer and having heat exchanger plates through which a heat-exchange medium flows and which are arranged essentially in the longitudinal direction of the reactor, at an angle α of from 0 to 70° in the direction of rotation of the stirrer relative to the reactor radius. Such a reactor is described in EP-B-0 633 060, preferably for highly exothermic hydrogenation reactions.

The multimetal cyanide complex catalyst is preferably used in amounts of less than 250 ppm, particularly preferably less than 100 ppm, in particular less than 50 ppm, based on the mass of product to be produced. In reactors equipped with heat exchanger plates, there is the danger that heterogeneous catalysts would be deposited in corners, angles or other areas with insufficient flow and will consequently be available only in an insufficient amount, if at all, for the catalytic reaction. This problem is not so critical at relatively high catalyst concentrations because a catalyst loss in this case does not have any extreme effect on the quality of the catalysis and of the products. On the other hand, at low catalyst concentrations, for example 100 ppm or less, the loss of available catalyst, even in an order of magnitude of a few 10 ppm, means a dramatic absolute loss of catalyst material and hence of catalyst activity. The result is substantially poorer product quality, broader molecular weight distributions and high molecular weight fractions. In contrast, it was surprisingly found that, in the novel process, such problems, did not occur in spite of very low catalyst concentrations and the high viscosity of the polyol, and no deterioration in the product quality took place.

In a preferred embodiment, the heat exchanger plates are bent or curved in the direction of rotation of the stirrer. This reduces the mechanical resistance.

A preferably used heat-exchange medium is water.

According to a preferred embodiment, the heat-exchange medium is passed from the heat exchanger plates in a loop flow via a heat exchanger arranged outside the reactor. Consequently, the heat removal can be additionally improved.

In order to ensure heat removal in the case of small amounts of initiator and to permit heating-up of the initiator, in particular at the beginning of the reaction, a further heat exchanger may also be arranged on the outer jacket of the reactor.

The heat exchanger arranged on the outer jacket of the reactor is preferably in the form of heat exchanger half-tubes.

The reaction is preferably carried out at from 90 to 200° C. and from 1 to 50 bar.

A temperature range of from 110 to 140° C. and a pressure of from 2 to 10 bar are particularly preferred.

The reaction is preferably carried out by the semibatch procedure, i.e. initiator and catalyst are initially taken and the alkylene oxide, i.e. ethylene oxide, propylene oxide, butylene oxide or a mixture thereof, is metered into the reactor until the desired molar mass is reached. This ensures that, on the one hand, there is no accumulation of alkylene oxide and hence the danger of a runaway reaction is avoided and, on the other hand, safe temperature control is achieved.

Thus, exact control of the residence time required for constant molecular weight distribution can be achieved.

By introducing stirring energy via the central stirrer, thorough mixing of all components of the reaction mixture is achieved. The arrangement of the heat exchanger plates in the reactor at an angle α of from 0 to 70° in the direction of rotation of the stirrer relative to the reactor radius leads to virtually complete freedom from a reaction temperature gradient over the reactor. Consequently, local overheating is avoided, resulting in a substantial suppression of secondary reactions and substantial avoidance of catalyst deactivation. Accordingly, high space-time yields are achieved, which are attributable to the good heat removal and the high alkylene oxide metering rate thus possible.

The invention is explained in more detail below with reference to an embodiment:

The following methods of determination were used:

The content of unsaturated components was determined via the iodine number. For this purpose, in a first process, the unsaturated fractions were brominated and excess bromine was reacted with potassium iodide solution with precipitation of iodine. The content of unsaturated components in milliequivalents/g (meq/g) was obtained by titrating the precipitated iodine with thiosulfate solution. The cycloacetal content was determined by headspace GC-MS analysis, the mass trace of m/e=130 being monitored. The sample temperature was 130° C.

COMPARATIVE EXAMPLE

An initiator (glyceryl propoxylate) having an average molar mass of 400 g/mol was initially taken in a stirred kettle having internal cooling coils. 100 ppm, based on the final polyol mass, of DMC were added.

The preparation of the multimetal cyanide catalyst was carried out in a two-stage process, in which first the acid and then the catalyst was obtained by precipitation. For this purpose, 7 l of strongly acidic ion exchanger which was in the sodium form, i.e. Amberlite® 252 Na from Rohm & Haas, were filled into an exchanger column having a length of 1 m and a volume of 7.7.l The ion exchanger was then converted into the acid form by passing 10% strength hydrochloric acid at a rate of 2 bed volumes per hour over the exchanger column for 9 hours until the sodium content in the discharge was <1 ppm. The ion exchanger was then washed with water. The regenerated ion exchanger was then used for preparing an essentially alkali-free hexacyanocobaltic acid. For this purpose, a 0.24 molar solution of potassium hexacyanocobaltate in water was passed over the ion exchanger at a rate of one bed volume per hour. After 2.5 bed volumes, the potassium hexacyanocobaltate solution was replaced with water. The 2.5 bed volumes obtained had on average a content of 4.5% by weight of hexacyanocobaltic acid and alkali contents of <1 ppm.

For the preparation of the catalyst, 8553.5 g of zinc acetate solution (content of zinc acetate dihydrate: 8.2% by weight, content of Pluronic® PE 6200, i.e. a block copolymer of ethylene oxide and propylene oxide, which is used for controlling the crystal morphology: 1.3% by weight) were then initially taken in a 20 l reactor and heated to 60° C. while stirring. 9956 g of hexacyanocobaltic acid solution (cobalt content 9 g/l, content of Pluronic® PE 6200 1.3% by weight) was then added in the course of 20 minutes at 60° C. with constant stirring. The suspension obtained was stirred for a further 60 minutes at 60° C. Thereafter, the solid thus obtained was filtered off and was washed with 6 times the cake volume. The moist filter cake was then dispersed in polypropylene glycol having a molar mass of 400 g/mol.

The dispersion thus obtained was used as the catalyst.

Dewatering was carried out for 1 hour under reduced pressure, after which propoxylation was effected until a molar mass of 3000 g/mol was reached. A space-time yield of 210 kg/m$^3$/h was obtained from the feed rate of the propylene oxide, which was limited only by the heat removal rate. A content of unsaturated components of 0.0052 meq/g was found. The content of cycloacetals was 0.06 ppm.

EXAMPLE

The reaction was carried out under the same experimental conditions as in the Comparative Example, but in a cylindrical reactor having a central stirrer with heat exchanger plates through which water flows and which were arranged in the longitudinal direction of the reactor and radially in the reactor. The reactor had a capacity of 40 t and the heat-exchange area was 600 m$^2$. As a result of the improved heat removal, the feed rate of the propylene oxide could be increased by a factor of 1.8 and consequently the space-time yield could be increased to 380 kg/m$^3$/h. The contents of unsaturated components and cycloacetals were determined as 0.0050 meq/g and 0.04 ppm, respectively.

Thus, by using the novel reactor, it was possible to achieve an increase of 80% in the space-time yield with slightly improved product quality.

We claim:

1. A process for the preparation of polyetherpolyols comprising reacting a reaction mixture comprising diols or polyols, ethylene oxide, propylene oxide, butylene oxide or a mixture thereof, and polyetherpolyols in the presence of a multimetal cyanide complex catalyst, wherein the reaction is carried out in a vertical, highly cylindrical reactor having a central stirrer and having heat exchanger plates through which a heat-exchange medium flows and which are arranged essentially in the longitudinal direction of the reactor, at an angle of from 0 to 70° in the direction of rotation of the stirrer relative to the reactor radius, and wherein the polyetherpolyols in the reaction mixture have a viscosity of greater than 20 mPa.s at a temperature of from 100 to 130° C.

2. A process as claimed in claim 1, wherein the heat exchanger plates are arranged radially.

3. A process as claimed in claim 1, wherein the multimetal cyanide complex catalyst is used in a concentration of less than 250 ppm, based on the mass of product to be produced.

4. A process as claimed in claim 1, wherein the heat exchanger plates are bent or curved in the direction of rotation of the stirrer.

5. A process as claimed in claim 1, wherein the heat-exchange medium is passed from the heat exchanger plates in a loop flow via a heat exchanger arranged outside the reactor.

6. A process as claimed in claim 1, wherein a heat exchanger is arranged on the outer jacket of the reactor.

7. A process as claimed in claim 6, wherein the heat exchanger arranged on the outer jacket of the reactor is in the form of heat exchanger half-tubes.

8. A process as claimed in claim 1, wherein the reaction is carried out at from 90 to 200° C. and from 1 to 50 bar.

9. A process as claimed in claim 8, wherein the reaction is carried out at from 110 to 140° C. and from 2 to 10 bar.

10. A process as claimed in claim 1, wherein the multimetal cyanide complex catalyst corresponds to the formula (I)

$$M^1_a[M^2(CN)_bL^1_c]d\ e(M^1_fX_g)hL^2.iH_2O \quad (I)$$

where $M^1$ is at least one element from the group consisting of ZN(II), Fe(II), Co(III), Ni(II), Mn(II), Co(II), Sn(II), Pb(II), Fe(III), Mo(IV), Mo(VI), Al(III), V(IV), V(V), Sr(II), W(VI), Cu(II), Cd(II), Hg(II), Pd(II), Pt(II), V(III), Mg(II), Ca(II), Sr(II), Ba(II) and Cr(III), $M^2$ is at least one element from the group consisting of Fe(II), Fe(III), Co(III), Cr(III), Mn(II), Mn(III), Ir(III), Rh(III), Ru(II), V(IV), V(V), Co(II) and Cr(II), $L^1$ is at least one ligand from the group consisting of cyanide, carbonyl, cyanate, isocyanate, nitrile, thiocyanate and nitrosyl, X is a formate anion, acetate anion or propionate anion, $L^2$ is at least one water-miscible ligand from the group consisting of alcohols, adehydes, ketones, ethers, polyethers, esters, urea derivatives, amides, nitriles and sulfides, a, b, c, d, e, f, g, h and i are integers, a, b, c and d being chosen so that the electroneutrality condition is fulfilled and f and g being chosen so that the electroneutrality is fulfilled, whose X-ray diffraction pattern has reflections at at least the d values 6.10 Å±0.004 Å
5.17 Å±0.04 Å
4.27 Å±0.02 Å
3.78 Å±0.02 Å
3.56 Å±0.02 Å
3.004 Å±0.007 Å
2.590 Å±0.006 Å
2.354 Å±0.004 Å
2.263 Å±0.004 Å if X is a formate anion, whose X-ray diffraction patter has reflections at at least the d values 5.20 Å±0.02 Å
4.80 Å±0.02 Å
3.75 Å±0.02 Å
3.60 Å±0.02 Å
3.46 Å±0.01 Å
2.824 Å±0.008 Å
2.769 Å±0.008 Å
2.608 Å±0.007 Å
2.398 Å±0.006 Å if X is an acetate anion, and whose X-ray diffraction pattern has reflections at at least the d values 5.59 Å±0.05 Å
5.40 Å±0.04 Å
4.08 Å±0.02 Å
3.94 Å±0.02 Å
3.76 Å±0.02 Å
3.355 Å±0.008 Å
3.009 Å±0.007 Å
2.704 Å±0.006 Å
2.381 Å±0.004 Å if X is a proprionate anion or which have a monoclinic crystal system if X is an acetate anion.

11. A process as claimed in claim 1, wherein the multimetal cyanide complex catalyst is substantially or completely crystalline.

12. A process as claimed in claim 11, wherein a multimetal cyanide complex catalyst of the zinc-cobalt type is used.

13. A process as claimed in claim 1, wherein the multimetal cyanide complex catalyst is used in a concentration of less than 100 ppm, based on the mass of product to be produced.

14. A process as claimed in claim 1, wherein the multimetal cyanide complex catalyst is used in a concentration of less than 50 ppm, based on the mass of product to be produced.

15. A process as claimed in claim 1, wherein the polyetherols in the reaction mixture have a viscosity of greater than 100 mPa.s.

16. A process as claimed in claim 1, wherein the polyetherols in the reaction mixture have a viscosity of from 80 to 1000 mPa.s.

* * * * *